(12) United States Patent
Lorenz

(10) Patent No.: US 8,134,402 B1
(45) Date of Patent: Mar. 13, 2012

(54) APPARATUS AND METHOD FOR POWERING UP WITH HYSTERESIS INACTIVE

(75) Inventor: Perry Scott Lorenz, Fort Collins, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 1140 days.

(21) Appl. No.: 10/774,799

(22) Filed: Feb. 9, 2004

(51) Int. Cl.
*H01L 35/00* (2006.01)
(52) U.S. Cl. ........................................ 327/512
(58) Field of Classification Search .................. None
See application file for complete search history.

(56) References Cited

U.S. PATENT DOCUMENTS

| | | | | |
|---|---|---|---|---|
| 3,878,484 A | * | 4/1975 | Hekimian | 331/143 |
| 5,614,857 A | * | 3/1997 | Lim et al. | 327/205 |
| 6,163,183 A | * | 12/2000 | Azimi et al. | 327/142 |
| 6,417,704 B1 | * | 7/2002 | Nakajima et al. | 327/143 |
| 6,897,689 B2 | * | 5/2005 | La Rosa | 327/143 |
| 2004/0174206 A1 | * | 9/2004 | Matsumura | 327/541 |

* cited by examiner

*Primary Examiner* — Lincoln Donovan
*Assistant Examiner* — Khareem E Almo
(74) *Attorney, Agent, or Firm* — Frommer Lawrence & Haug LLP; Matthew M. Gaffney

(57) ABSTRACT

A temperature-sensor circuit is provided. The temperature-sensor circuit may be configured such that an output of the temperature-sensor circuit trips when a specified temperature is reached. The temperature-sensor circuit may also be configured to trigger hysteresis if the specified temperature is reached. Additionally, the temperature-sensor circuit may be configured for powering up with hysteresis disabled. However, after the completion of a settling period, the hysteresis is enabled for triggering based on the temperature.

34 Claims, 3 Drawing Sheets

APPARATUS AND METHOD FOR POWERING UP WITH HYSTERESIS INACTIVE

FIELD OF THE INVENTION

The invention is related to hysteresis, and in particular, to an apparatus and method for ensuring that a temperature-sensor circuit that employs hysteresis, powers up with the hysteresis inactive.

BACKGROUND OF THE INVENTION

A temperature-sensor circuit may be configured to trip at a specified temperature. For example, in a rising temperature application, a temperature-sensor circuit may be configured to trip if the specified temperature is exceeded. This application may be used to activate a fan when the specified temperature is reached. Conversely, in a falling temperature application, a temperature-sensor circuit may be configured to trip if the temperature drops below the specified temperature. For a falling temperature application, the temperature-sensor circuit may be employed to activate a heater if the specified temperature is reached.

A temperature-sensor circuit that trips at a specified temperature may employ hysteresis. Hysteresis may prevent the output of the temperature-sensor circuit from oscillating. Typically, 2° C. to 10° C. of hysteresis is used with temperature-sensor circuits.

BRIEF DESCRIPTION OF THE DRAWINGS

Non-limiting and non-exhaustive embodiments of the present invention are described with reference to the following drawings, in which.

DETAILED DESCRIPTION

Figure 1:
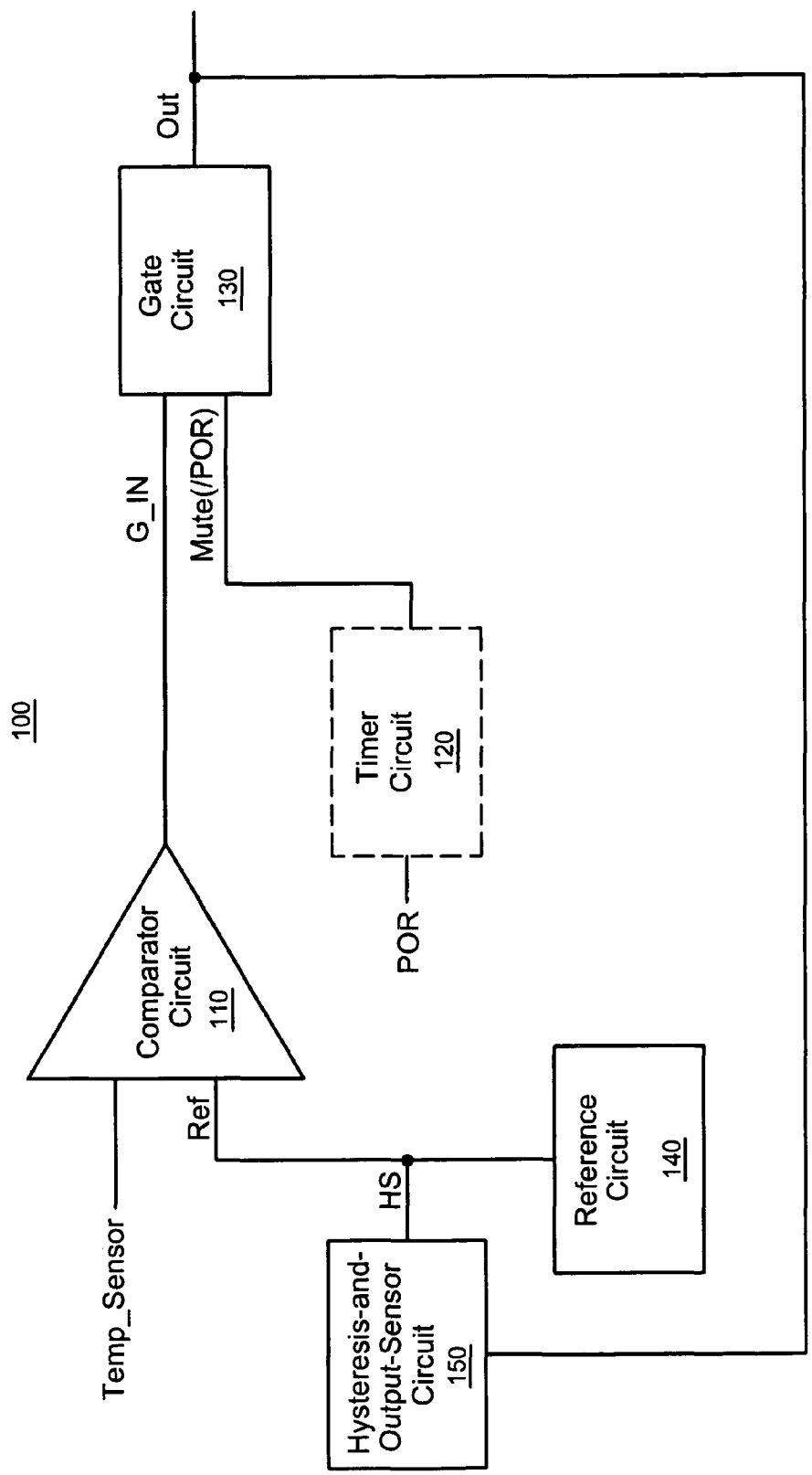
FIG. 1 illustrates an embodiment of a circuit for temperature sensing.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The term "connected" means a direct electrical connection between the items connected, without any intermediate devices. The phrase "in one embodiment," as used herein does not necessarily refer to the same embodiment, although it may. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a temperature-sensor circuit. The temperature-sensor circuit may be configured such that an output of the temperature sensor trips when a specified temperature is reached. The temperature-sensor circuit may also be configured to trigger hysteresis if the specified temperature is reached. Additionally, the temperature-sensor circuit may be configured to power up with hysteresis disabled during rising power. However, after the completion of a settling period, the hysteresis is enabled for triggering based on the temperature.

FIG. 1 illustrates an embodiment of a circuit (100) for temperature sensing. Circuit 100 may be configured to provide an output signal (OUT) such that signal OUT is either high or low, depending on whether a temperature-sensing condition occurs. Circuit 100 may also be configured to trigger hysteresis if the temperature-sensing condition occurs. Additionally, circuit 100 is configured to ensure that the hysteresis is not active when circuit 100 is in the process of powering up.

Circuit 100 may include several components, such as comparator circuit 110, timer circuit 120, gate circuit 130, hysteresis-and-output-sensor circuit 150, and reference circuit 140. Timer circuit 120 is an optional component that need not be included in circuit 100.

Comparator circuit 110 may be arranged to provide a trigger signal by comparing a reference signal (Ref) to a temperature sensor signal (Temp_sensor). The trigger signal may correspond to a triggered logic level if a voltage associated with signal Ref is greater than a voltage associated with signal Temp_sensor, and the trigger signal may correspond to an untriggered logic level if the voltage associated with signal Ref is less than Temp_sensor. According to one embodiment, a gate input signal (G_IN) is the trigger signal. According to another embodiment, signal G_IN is another signal that is based at least in part on the trigger signal.

Signal Temp_sensor is related to the temperature. According to one embodiment, signal Temp_sensor is an analog signal having a voltage that is inversely proportional to the temperature. In other embodiments, signal Temp_sensor may have a different mathematical relationship with the temperature.

Timer circuit 120 may be configured to provide a mute signal (Mute) in response to a power-on-reset signal (POR). According to one embodiment, timer circuit 120 is configured to provide signal Mute such that signal Mute corresponds to an active logic level when a power supply signal is applied to the circuit, and for a pre-determined period of time thereafter, and such that signal Mute corresponds to an inactive level after the pre-determined period of time.

Gate circuit 130 may be arranged to provide signal OUT by gating signal G_IN subject to control by signal Mute. For example, gate circuit 130 may be configured to provide signal OUT such that a logic level of signal OUT corresponds to a logic level of the trigger signal if signal Mute corresponds to an inactive level, and the logical level of signal OUT corresponds to an untriggered logic level if signal Mute corresponds to an active level.

Alternatively, gate circuit 130 may be arranged to provide signal OUT by gating signal G_IN subject to the control of signal POR. Signal POR may change from low to high at a brief period of time after power is applied. In one embodiment, signal Mute changes from low to high at a predetermine amount of time after power is applied. In this embodiment, the low-to-high change in signal Mute is delayed relative to signal POR. Employing signal Mute rather than signal POR is a more conservative design, and may be used to ensure that adequate settling time has occurred.

In one embodiment, hysteresis-and-output-sensor circuit 150 is configured to control signal Ref in response to signal OUT. In another embodiment, the output sensor circuit may be responsive to a different signal that is based at least in part on signal OUT. In any case, hysteresis-and-output-sensor circuit 150 may be arranged to modify signal Ref if hysteresis-and-output-sensor circuit 150 is enabled. Also, hysteresis-and-output-sensor circuit 150 may be disabled if signal OUT corresponds to the untriggered logic level. The hysteresis is active if hysteresis-and-output-sensor circuit 150 is enabled, and the hysteresis is inactive if hysteresis-and-output-sensor circuit 150 is disabled.

Additionally, reference circuit 140 may be configured to provide signal Ref in conjunction with hysteresis-and-output-sensor circuit 150.

Figure 2:
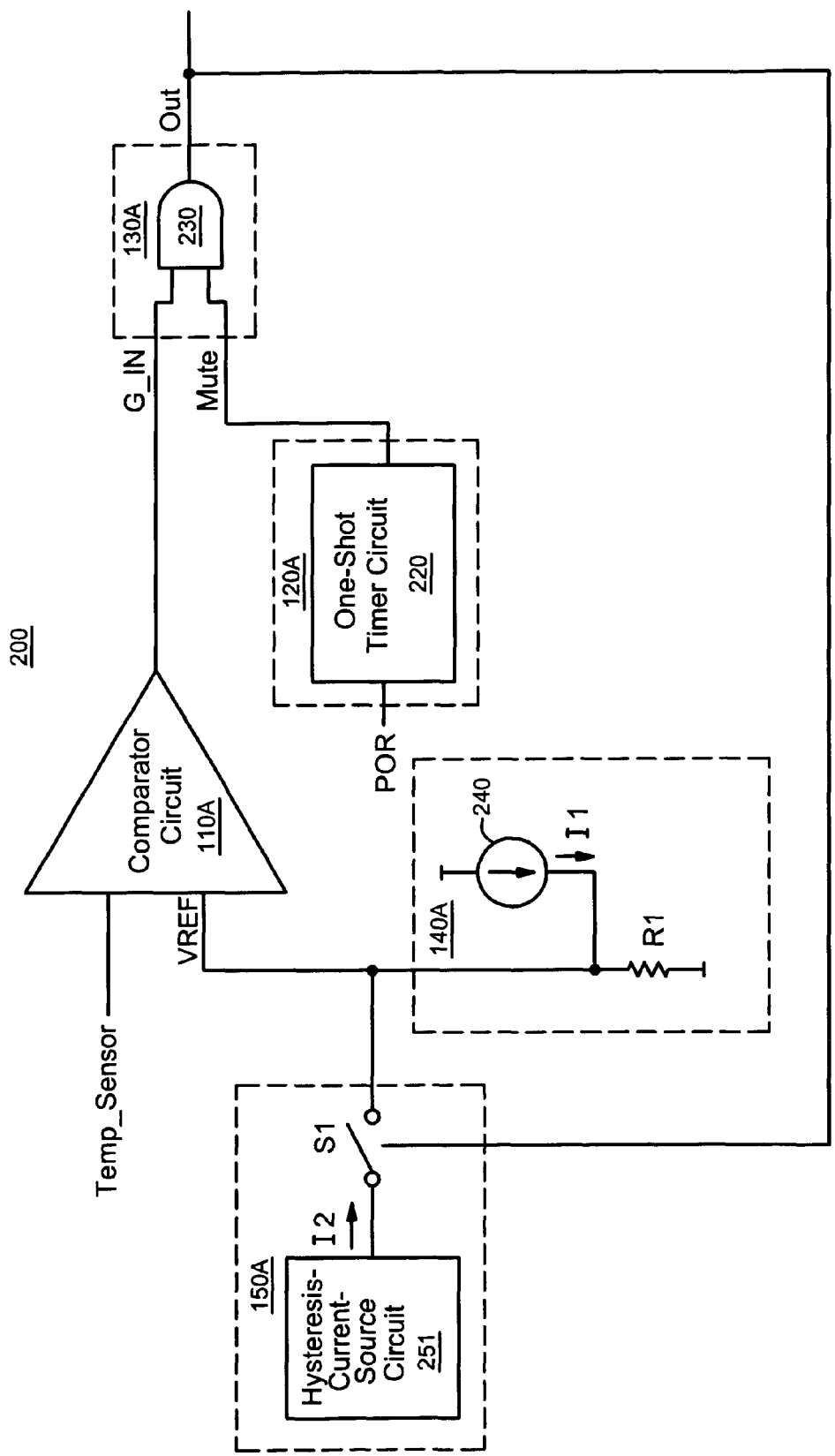
FIG. 2 shows a circuit that is an embodiment of the circuit of FIG. 1.

FIG. 2 shows a circuit (200) that is another embodiment of circuit 100. Comparator circuit 110A, timer circuit 120A, gate circuit 130A, reference circuit 140A, and hysteresis-and-output-sensor circuit 150A are other embodiments of comparator circuit 110, timer circuit 120, gate circuit 130, reference circuit 140, and hysteresis-and-output-sensor circuit 150, respectively. Timer circuit 120A may include one-shot timer circuit 220. Gate circuit 130A may include AND gate 230. Additionally, reference circuit 140A may include resistor R1 and current source 240. Further, resistor R1 may be coupled to hysteresis-and-output-sensor circuit 150A and comparator circuit 110A. Hysteresis-and-output-sensor circuit 150A may include a switch circuit 51 and a hysteresis-current-source 251.

In one embodiment, the mute signal is active low, and will therefore be referred to as signal muteB. In another embodiment, the mute signal is active high.

One-shot timer circuit 220 may be configured to be activated by signal POR. According to one embodiment, signal MuteB corresponds to an active level for approximately half of a millisecond after power is applied to circuit 200, and signal MuteB corresponds to an inactive level afterwards. According to another embodiment, signal MuteB may be maintained at the active level for an amount of time other than approximately half of a millisecond.

Current source circuit 240 is configured to provide current I1 to resistor R1.

Hysteresis-current-source 251 is configured to provide hysteresis current I2. Switch circuit S1 is configured to be open if signal OUT corresponds to an untriggered logic level, and closed if signal OUT corresponds to a triggered logic level. Switch circuit S1 may include a MOS transmission gate, and the like. Hysteresis-and-output-sensor circuit 150A may be configured to provide hysteresis current I2 to resistor R1 if signal OUT corresponds to a triggered logic level. Accordingly, resistor R1 is configured to provide a reference voltage (vref) that is approximately given by vref=(I1+I2)*R1. Voltage vref is an embodiment of signal Ref. The magnitude of hysteresis current I2 determine, in part, the amount of hysteresis, and the polarity of hysteresis current I2 determines whether the hysteresis is activated by a rising temperature or a falling temperature, depending on the application.

According to one embodiment, circuit 200 may be used for an application in which circuit 200 is generally left in a power off mode. In this embodiment, circuit 200 may be powered on periodically to sample the temperature. When circuit 200 is powered on, hysteresis is initially inactive. Accordingly, for a rising temperature application, circuit 200 may be configured to unambiguously indicate whether it is above a specified temperature. Similarly, for a falling temperature application, circuit 200 may be configured to unambiguously indicate whether it is below a specified temperature.

Although not shown in FIG. 2, resistor R1 may be replaced by a variable resistor. The resistor can be internal or external. According to one embodiment, the resistance of the variable resistor may be adjusted to adjust the trip point temperature. The trip point temperature may also be set in a variety of other ways.

In another embodiment, although not shown in FIG. 2, hysteresis-current-source 251 may be controlled by a control signal. The control signal may be selected to adjust the polarity of hysteresis current I2 according to whether a falling temperature application or a rising temperature application is desired.

Figure 3:
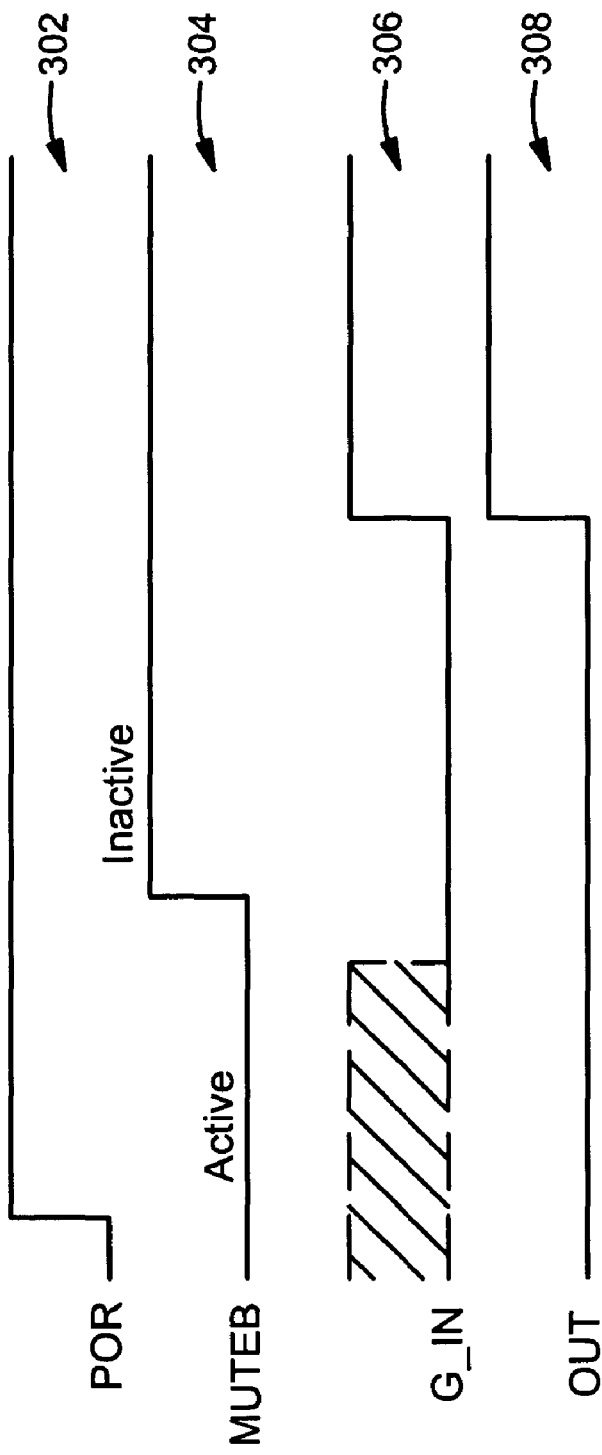
FIG. 3 illustrates a flowchart of embodiments of signals with reference to FIG. 2.

FIG. 3 illustrates a flowchart of embodiments for signals of circuit 200. FIG. 3 illustrates a waveform (302) for signal POR, a waveform (304) for signal MuteB, a waveform (306) for signal G_IN, and a waveform (308) for signal Out. FIG. 3 illustrates waveforms for one embodiment of circuit 200. For other embodiments of circuit 200, signal behavior may be different.

For the embodiment illustrated in FIG. 3, signal POR changes from logic zero to logic one shortly after power has been applied. When power is applied signal MuteB may remain at logic zero for a pre-determined period of time, and then change to logic one.

Signal Out remains at logic zero while signal MuteB is active, regardless of the logic level of signal G_IN. Signal G_IN may be either high or low during power up if the temperature is in the hysteresis zone. In FIG. 3, signal G_IN is shown as undetermined for part of the time that signal MuteB is active. During this time, signal Out remains at logic zero even if signal G_IN corresponds to logic one. This way, hysteresis remains inactive when power is first applied, and remains inactive, regardless of the logic level of signal G_IN, until the logic level of signal MuteB is inactive.

When signal MuteB changes to inactive, the logic level of signal OUT is the same as the logic level of signal G_IN. This way, hysteresis can be activated normally after power has been applied and adequate time has been allowed for settling to occur.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for temperature sensing, comprising:
  a comparator circuit that is arranged to provide a trigger signal by comparing a reference signal to a temperature sensor signal;
  a power-on-reset generator that is arranged to provide a power-on reset signal;
  a gate circuit that is arranged to provide an output signal by gating a gate input signal subject to control by a gate control signal, wherein the gate input signal is based at least in part on the trigger signal, and wherein the gate control signal is based at least in part on the power-on-reset signal; and
  a hysteresis-and-output-sensor circuit that is configured to control the reference signal in response to a sensed signal, wherein the sensed signal is based at least in part on the output signal, and wherein the hysteresis-and-output sensor circuit is arranged to disable a hysteresis at power up, wherein the comparison of the reference signal to the temperature signal made by the comparison circuit is a temperature comparison in which a determination is made as to whether a temperature has reached a predetermined level, wherein the predetermined level is modified by a predetermined amount when hysteresis is enabled.

2. The circuit of claim 1, wherein the power-on-reset signal is the gate control signal.

3. The circuit of claim 1, further comprising:
a timer circuit that is configured to provide a mute signal in response to the power-on-reset signal, wherein the mute signal is the gate control signal.

4. The circuit of claim 3, wherein the timer circuit includes a one-shot timer circuit, wherein the one-shot timer circuit is configured to provide the mute signal such that the gate control signal such that the mute signal corresponds to an active logic level when a power supply signal is applied to the circuit, and for a pre-determined period of time thereafter; and such that the mute signal corresponds to an inactive level after the pre-determined period of time.

5. The circuit of claim 1, wherein the sensed signal is the output signal, and wherein the gate input signal is the trigger signal.

6. The circuit of claim 1, wherein the gate circuit is configured to provide the output signal such that a logic level of the output signal corresponds to a logic level of the trigger signal if the gate control signal corresponds to an inactive level, and the logical level of the output signal corresponds to a first logic level if the gate control signal corresponds to an active level.

7. The circuit of claim 1, wherein the gate circuit includes an AND gate.

8. The circuit of claim 1, wherein the comparator circuit is configured to provide the trigger signal such that the trigger signal corresponds to a first logic level if a voltage associated with the reference signal is greater than a voltage associated with the temperature sensor signal, and the trigger corresponds to a second logic level if the voltage associated with the reference signal is less than the temperature sensor signal.

9. The circuit of claim 1, further comprising:
a reference circuit that is configured to provide the reference signal in conjunction with the hysteresis-and-output-sensor circuit,
wherein the hysteresis-and-output-sensor circuit is arranged to modify the reference signal if the hysteresis-and-output-sensor circuit is enabled, and wherein the hysteresis-and-output-sensor circuit is disabled if the output signal corresponds to a first logic level.

10. The circuit of claim 9, wherein the reference circuit includes:
a resistor that is coupled to the hysteresis-and-output-sensor circuit and the comparator circuit; and
a current source circuit that is configured to provide a current to the resistor.

11. The circuit of claim 10, wherein the hysteresis-and-output-sensor circuit is configured to provide a hysteresis current to the resistor if the output signal corresponds to the second logic level.

12. The circuit of claim 10, wherein a resistance that is associated with the resistor is adjustable.

13. A method for temperature sensing, comprising:
employing a circuit to activate hysteresis if a temperature-sensing condition has occurred; and
ensuring that the hysteresis is automatically inactive when the circuit is powering up, wherein the temperature-sensing condition is a temperature comparison in which a determination is made as to whether a temperature has reached a predetermined level, wherein the predetermined level is modified by a predetermined amount when hysteresis is enabled.

14. The method of claim 13, further comprising providing a reference signal, wherein activating the hysteresis includes modifying the reference signal, and wherein the hysteresis is active if the output signal corresponds to a first logic level.

15. The method of claim 13, wherein ensuring includes providing an output signal in response to a gate input signal and a gate control signal, wherein the gate control signal is derived form a power-on-reset signal, a logic level of the output signal corresponds to a logic level of the gate input signal if the gate control signal corresponds to an inactive level, and the logical level of the output signal corresponds to a first logic level if the gate control signal corresponds to an active level.

16. The method of claim 15, furthering comprising:
comparing a temperature sensor signal to a reference signal; and
providing a trigger signal in response to the comparison, wherein the gate input signal is based at least in part on the trigger signal.

17. The method of claim 15, wherein providing the output signal includes performing a logical AND function on the gate input signal and the gate control signal.

18. The method of claim 15, further comprising:
applying a power supply signal; and
providing the gate control signal in response to the power-on-reset signal, wherein providing the gate control signal includes:
providing the gate control signal such that the gate control signal corresponds to an active logic level when the power supply signal is initially applied, and for a pre-determined period of time thereafter; and
providing the gate control signal such that the gate control signal corresponds to an inactive level after the pre-determined period of time.

19. The method of claim 15, further comprising:
providing a first current; and
converting a reference current into the reference signal, wherein activating the hysteresis includes:
providing a hysteresis current if the output signal corresponds to a first logic level;
providing substantially no current if the output signal corresponds to a second logic level; and
providing the reference current by combining the first current and the hysteresis current.

20. A circuit for temperature sensing, comprising:
means for activating hysteresis if a temperature-sensing condition has occurred; and
means for ensuring that the hysteresis is automatically inactive when the means for activating hysteresis is powering up, wherein the temperature-sensing condition is a temperature comparison in which a determination is made as to whether a temperature has reached a predetermined level, wherein the predetermined level is modified by a predetermined amount when hysteresis is enabled.

21. A circuit for temperature sensing, comprising:
a comparator circuit that is arranged to provide a trigger signal by comparing a reference signal to a temperature sensor signal;
a gate circuit that is arranged to provide an output signal by gating a gate input signal subject to control by a gate control signal, wherein the gate input signal is based at least in part on the trigger signal, and wherein the gate control signal is based at least in part on a power-on-reset signal;

a hysteresis-and-output-sensor circuit that is configured to control the reference signal in response to a sensed signal, wherein the sensed signal is based at least in part on the output signal; and a temperature sensor signal generation circuit, wherein the temperature sensor signal generation circuit is arranged to provide the temperature sensor signal such that the temperature sensor signal is indicative of a temperature, wherein the comparison of the reference signal to the temperature signal made by the comparator circuit is a temperature comparison in which a determination is made as to whether a temperature has reached a predetermined level, wherein the predetermined level is modified by a predetermined amount when hysteresis is enabled.

22. The circuit of claim 21, wherein the circuit for temperature sensing is arranged such that the comparator circuit trips when the temperature sensed by the temperature sensor signal reaches a pre-determined level, and wherein the pre-determined level is modified by a pre-determined amount when hysteresis is enabled.

23. The circuit of claim 21, wherein the temperature sensor signal is proportional to a temperature.

24. The circuit of claim 1, wherein the comparator circuit compares the temperature sensor signal to the reference signal in order to perform a temperature comparison.

25. The circuit of claim 24, wherein the hysteresis-and-output-sensor circuit is arranged to provide the hysteresis in a range of about 2° C. to about 10° C. of hysteresis for the temperature comparison when the hysteresis is enabled.

26. The method of claim 16, further comprising:
activating at least one of a fan or a heater when the output signal is asserted.

27. The method of claim 13, wherein
ensuring that the hysteresis is automatically inactive when the circuit if powering up is accomplished by disabling the hysteresis until the power up is complete.

28. The method of claim 16, further comprising:
activating at least one of a fan or a heater when the output signal is asserted, such that the at least one of the fan or heater changes from inactive to active when the output signal is asserted.

29. The method of claim 16, further comprising:
activating a fan when the output signal is asserted.

30. The method of claim 16, further comprising:
activating a heater when the output signal is asserted.

31. The method of claim 16, wherein the temperature sensor signal is indicative of a temperature.

32. The method of claim 16, wherein the temperature sensor signal is proportional to temperature.

33. The method of claim 16, wherein the temperature-sensing condition is a temperature comparison in which a determination is made as to whether a temperature has reached a predetermined level, wherein the predetermined level is modified by a predetermined amount when hysteresis is enabled.

34. The method of claim 13, wherein the hysteresis is hysteresis in a range of about 2° C. to about 10° C. of hysteresis for the temperature comparison when the hysteresis is enabled.

* * * * *